Figure 1:
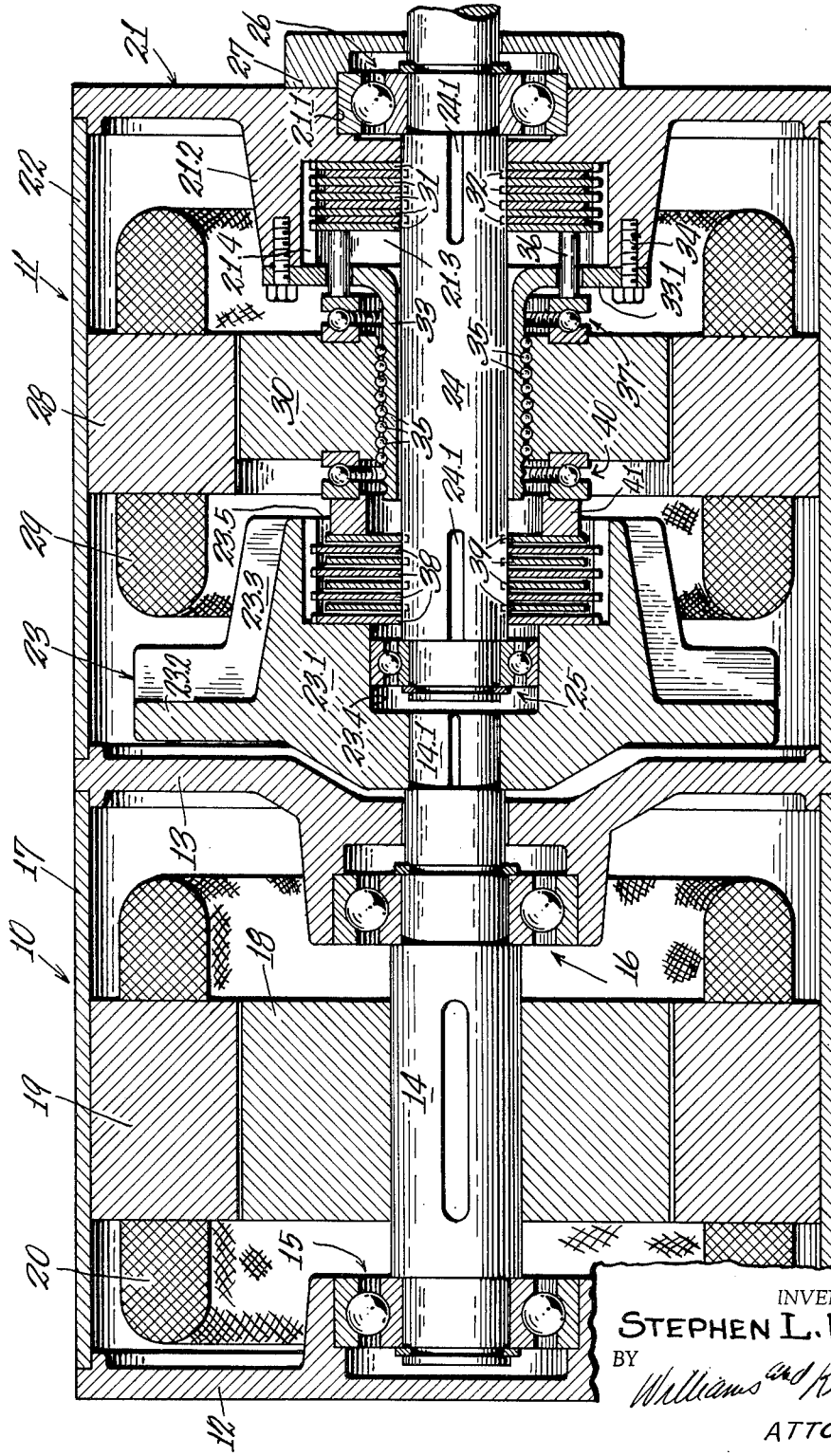

INVENTOR.
STEPHEN L. POP
BY
Williams and Koske
ATTORNEYS

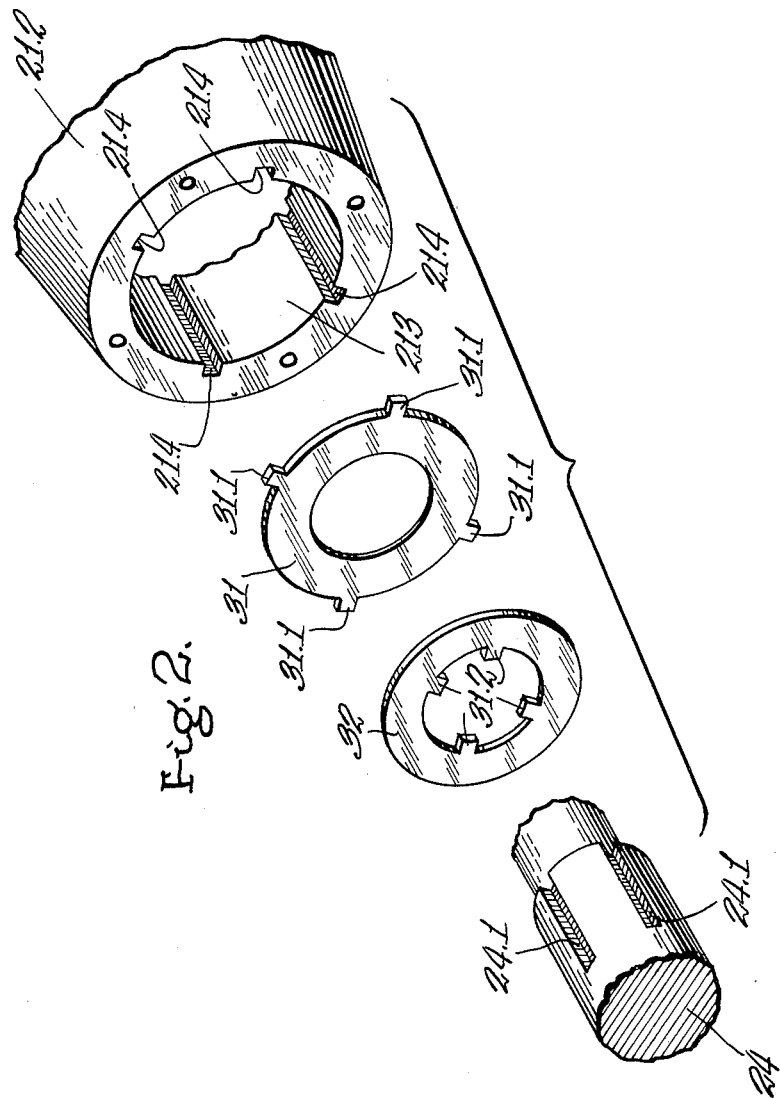

United States Patent Office 3,235,045
Patented Feb. 15, 1966

3,235,045
CLUTCH-BRAKE DEVICE AND ACTUATING MECHANISM
Stephen L. Pop, Warren, Ohio, assignor to Peerless Electric Division of H. K. Porter Company, Inc., Warren, Ohio
Filed Dec. 18, 1963, Ser. No. 331,433
4 Claims. (Cl. 192—18)

The present invention relates to a novel linear actuating mechanism, particularly, though not necessarily adapted for use with a clutch and/or brake device, and is an improvement on the apparatus disclosed in application Serial No. 180,974, filed March 20, 1962, by Elmer A. Roller and Stephen L. Pop, entitled Clutch-Brake Device and Actuating Mechanism, assigned to the same assignee as the present case, and the principal object of the invention is to provide new and improved mechanisms and devices of the character described.

Many objects of the present invention and advantages over the prior art have been outlined in the application aforesaid and thus need not be repeated herein; however, the present invention is an improvement over the previous application in that actuating forces are more efficiently applied and better high-speed operation is effectuated since friction and inertia is markedly reduced. These and other advantages of the present invention will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a view in longitudinal section through a preferred embodiment of the invention, and FIGURE 2 is a fragmentary exploded perspective view of certain details seen in FIGURE 1.

With reference to FIGURE 1, there is shown in longitudinal section an integrated device in part comprising an electric motor section 10 and a clutch-brake section 11 in end-to-end, abutting relation. Turning first to the electric motor section 10, the latter comprises axially spaced end frames 12 and 13 rotatably supporting a rotor shaft 14 by respective ball bearing assemblies 15 and 16. A tubular housing 17 maintains the end frames in the required spaced relation, the end frames being clamped against the housing in any suitable manner such as by conventional elongated bolts (not shown) extending between the end frames. Keyed or otherwise secured to the shaft 14 between the frames 12, 13 is a rotor 18 formed in any suitable manner. Although not shown, such rotor may be of the usual laminated construction and of a size to fit within a suitable stator 19 which may also be laminated in the usual manner. For producing a rotating magnetic field when alternating current is fed thereto, stator 19 will carry the usual windings 20. For a purpose to appear, shaft 14 has a reduced diameter portion 14.1 projecting through an aperture in the end frame 13.

Clutch-brake section 11 is similar to motor section 10 in that it comprises an end frame 21 spaced from the motor end frame 13 by a tubular housing 22. Frame 13, therefore, not only serves as an end frame of the motor section 10 but also as an end frame of the adjoining clutch-brake section 11. Also, although not shown, tubular housing 22 may be clamped between the end frames 13, 21 by means of the usual elongated bolts extending between such end frames.

Disposed within the left end of the tubular housing 22 and keyed or otherwise secured to the projecting shaft portion 14.1 is a body 23 having an enlarged hub portion 23.1 and at its left end a radially enlarged flange portion 23.2. A series of fins 23.3 may be formed integrally with the body 23 so that the latter functions as a fan to force cooling air through both the motor section and the clutch-brake section. Although not shown, suitable passages for flow of cooling air may be provided in the three end frames, the two tubular housings, and/or wherever else found appropriate as clearly pointed out in the previously mentioned, co-pending application.

Disposed within the tubular housing 22 is a shaft 24 in end-to-end co-axial relation with the motor shaft 14. The left end of shaft 24 is rotatably supported by a bearing assembly 25 seated in a recess 23.4 in the body 23 and its right end is rotatably supported by a bearing assembly 26 clamped in a recess 21.1 in the end frame 21 by means of an apertured bearing retainer 27 through which the shaft 24 projects for connection to whatever apparatus is to be driven and braked by the present mechanism.

Also disposed within the tubular housing 22 is a stator 28 with windings 29 which may be similar to the previously described motor stator 19 and windings 20. Rotatably supported within the stator 28 is a rotor body 30, similar to the motor rotor 18, but mounted in an entirely different manner as will later be disclosed. For the present, it will be sufficient to state that when windings 29 are energized by alternating current, a magnetic field is produced which tends to rotate the rotor body 30 in one direction or the other depending upon circuit connections to the windings.

Clutch-brake section 11 of the present device may be further sub-divided into a brake section on the right and a clutch section on the left and with reference first to the brake section, it will be noted that end frame 21 is provided with a central, enlarged boss 21.2 within the housing 22 and having a recess 21.3 concentric with the shaft 24. For a purpose to appear and with reference also to FIGURE 2, a plurality of axially extending, peripheral slots 21.4 are spaced about the recess. Similarly, the portion of shaft 24 within the boss recess 21.3 is provided with a plurality of axially extending, peripheral slots 24.1.

Disposed in side-by-side relation within the boss recess 21.3 and about the shaft 24 are a plurality of friction members 31, 32 which may be formed of steel, brass or other suitable material. Frequently, though not necessarily, some of the friction members may be made of one material while others may be made of another material. At the present time, friction members 31, 32 take the form of disks having an external size to fit within the recess 21.3 and an internal aperture to fit over the shaft 24. As best seen in FIGURE 2, friction disk members 21 have outer peripheral tabs 31.1 slidably fitting within the end plate boss slots 21.4 while the members 32 have inner peripheral tabs 32.1 slidably fitting within the shaft slots 24.1.

As best seen in FIGURE 1, the friction disk members 31, 32 are disposed in recess 21.3 and about shaft 24 in alternate relation, five members 31 and four members 32 presently being provided although a greater or lesser number could well be used. All of the members 31, 32 are free to move axially of the shaft toward and away from each other; however, disk members 31 are held against rotation by interengagement of their tabs 31.1 in the boss slots 21.4 while the disk members 32 are unitarily rotatable with the shaft 24 by interengagement of their tabs 31.2 with the shaft slots 24.1.

Before describing the function of the disk members 31, 32 it is to be noted that while the rotor body 30 is concentric with the shaft 24, it is not carried thereby but is instead isolated therefrom. This provides important advantages as will appear. Extending axially and concentrically of the shaft 24 and providing operating clearance for such shaft therewithin is a sleeve member 33 having a radially outwardly projecting flange portion 33.1 secured to the end frame boss 21.2 by means of screws 34 or the like. Member 33 is adapted to rotatably support rotor 30 in such manner that rotation of the rotor by the rotating magnetic field generated by the windings 29 is translated to axial movement of the rotor.

To provide the translation aforesaid of the rotor 30, the outer periphery of the sleeve member 33 and the inner periphery of the rotor 30 are formed with corresponding screw threads. It is an important feature, however, that such threads are not directly engaged with each other but instead, a plurality of ball bearings 35 are interposed between the rotor and the sleeve in engagement with respective threads. The use of such bearings 35 greatly reduces friction between the rotor 30 and the sleeve 33 and reduces inertial accelerating forces on the rotor.

As hereinabove described, rotation of rotor 30 is translated to axial movement thereof and such axial movement is translated to axial movement of the friction disk members 31, 32 toward each other by means of a plurality of pins 36 slidably projecting through apertures in the sleeve flange portion 33.1 for engagement of one end of each pin with the adjoining disk member 31. The opposite end of each pin 36 is engaged with a thrust bearing assembly 37 interposed between the rotor and the pins. Accordingly, rotation of rotor 30 in a direction to cause rotor movement to the right will, through the thrust bearing 37 and the pins 36, press the friction disk members 31, 32 to close engagement to lock the shaft 24 to the end frame 21 thus braking the shaft and retaining it against rotation.

Turning now to the left of the clutch-brake section 11, the clutch section thereat is very similar to the previously described brake section on the right. That is, the clutch section has alternate, axially movable friction disk members 38, 39 corresponding to the disk members 31, 32 and disposed in a member recess 23.5 corresponding to the end frame recess 21.3. The disk members 39, like the disks 32, are interlocked with the shaft 24 for unitary rotation therewith while the disk members 38, like the disks 31, are interlocked with the member 23. Interposed between the stack of disks 38, 39 and the rotor 30 is a thrust bearing 40 and a ring-like spacer 41.

Assuming that the motor section windings 20 are energized to thus rotate the rotor 18, the shaft 14 and the attached member 23, it is to be noted that the disks 31, 32 are shown in engagement, thereby locking the shaft 24 against rotation, since it is assumed that at this time the windings 29 are so energized to cause rotation of rotor 30 in a direction to cause it to move to the right.

When it is desired to release the shaft 24 and to couple it to the motor shaft 14, windings 29 will be so energized to rotate the rotor 30 in the opposite direction thus causing it move to the left from the position shown. As the rotor 30 moves along the sleeve 33 to the left, the disks 31, 32 will be free to move axially apart to thus unlock the shaft 24 from the end frame 21 while the disks 38, 39 will be forced together to thus lock the shaft 24 to the rotating member 23. This will, of course, effect unitary rotation between the motor shaft 14 and the shaft 24.

When rotation of shaft 24 is to be terminated, windings 29 will once again be energized to cause rotation of rotor 30 in a direction to cause the rotor to move to the right to the position seen in FIGURE 1 wherein the disks 38, 39 are free to move axially apart thus disconnecting the shaft 24 from the motor shaft 14 and wherein the disks 31, 32 are pressed together to thus lock the shaft 24 against rotation.

While in the above description of operations the windings 29 have been described as being energized at all times so that the shaft 24 is either locked to the motor shaft or locked against rotation, it will be understood that it may be desirable under certain circumstances to merely de-energize the windings 29 thus leaving the shaft 24 free to rotate but without being engaged with the motor shaft 14.

Since in the embodiment herein disclosed, the rotor 30 is isolated from the shaft 24, the clutch-brake section 11 is entirely independent of the direction of rotation of the motor section 10. This is in sharp contrast to the structure of the previously mentioned application wherein there was a correlation of rotation between the two sections.

While a combined clutch-brake device has herein been described, it will be understood that a clutch or brake device alone, using the principles herein disclosed, could well be employed along lines similar to those disclosed in the previously mentioned application.

Finally, while the windings 20, 29 are described as being connected to a source of alternating current to produce a rotating magnetic field, it will readily be apparent that the principles of direct current motors could as well be employed. In such case, of course, the windings 20, 29 would be different, the rotors 18 and 30 would carry windings and would thus be known as armatures, and commutators and brushes would be provided to carry current to the armature windings.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A clutch-brake unit comprising a pair of concentric, relatively rotatable shafts in end-to-end relation, first and second sets of friction members spaced axially along one of said shafts and one friction member of each set being rotatable in unit with said one shaft, the other friction member of said first friction member set being held against rotation and the other friction member of said second friction member set being rotatable in unit with said other shaft, the friction members of said first friction member set being relatively axially movable to engagement to impede rotation of said one shaft and relatively axially movable away from engagement to provide for unimpeded rotation of said one shaft, and the friction members of said second friction member set being relatively axially movable to engagement thus connecting said shafts for unitary rotation and relatively axially movable away from engagement thus disconnecting said shafts from unitary rotation, means for producing a magnetic field, a body disposed intermediate said friction member sets for rotation by said magnetic field, and a fixedly positioned sleeve member surrounding said one shaft intermediate said friction member sets and said body having screw threaded engagement with said sleeve member whereby rotation of said body effects axial movement of said body and consequent relative axial movement of said friction members.

2. The construction of claim 1 wherein said sleeve has a radially outwardly extending portion which provides for mounting said sleeve in position.

3. The construction of claim 1 wherein a plurality of ball bearings are interposed between said body and said sleeve member to reduce friction therebetween.

4. The construction of claim 1 wherein said sleeve is mounted in position by means of a radially outwardly extending annular flange carried thereby and interposed between said body and one of said friction member sets, wherein said flange is apertured, and wherein means extends through the flange aperture for connecting said body to the aforesaid one friction member set.

References Cited by the Examiner
UNITED STATES PATENTS

| | | | |
|---|---|---|---|
| 2,008,873 | 7/1935 | Nydegger | 192—18 |
| 2,440,304 | 4/1948 | Simmons | 192—18 |

FOREIGN PATENTS

| | | |
|---|---|---|
| 457,518 | 6/1949 | Canada. |
| 1,059,888 | 11/1953 | France. |
| 424,327 | 1/1926 | Germany. |
| 890,587 | 9/1953 | Germany. |

DON A. WAITE, *Primary Examiner.*

DAVID J. WILLIAMOWSKY, *Examiner.*